United States Patent
Rajaram et al.

(10) Patent No.: US 11,185,854 B2
(45) Date of Patent: Nov. 30, 2021

(54) COLD START CATALYST AND ITS USE IN EXHAUST SYSTEMS

(71) Applicant: Johnson Matthey Public Limited Company, London (GB)

(72) Inventors: Raj Rao Rajaram, Slough (GB); Hai-Ying Chen, Conshohocken, PA (US); Dongxia Liu, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/563,298

(22) Filed: Dec. 8, 2014

(65) Prior Publication Data

US 2015/0158023 A1  Jun. 11, 2015

Related U.S. Application Data

(60) Provisional application No. 61/912,825, filed on Dec. 6, 2013.

(51) Int. Cl.

| | |
|---|---|
| *F01N 3/08* | (2006.01) |
| *B01D 53/94* | (2006.01) |
| *B01J 35/04* | (2006.01) |
| *B01J 29/74* | (2006.01) |
| *B01J 37/02* | (2006.01) |
| *B01J 37/00* | (2006.01) |
| *B01J 29/068* | (2006.01) |
| *B01J 23/42* | (2006.01) |
| *B01J 21/04* | (2006.01) |
| *B01J 29/84* | (2006.01) |
| *B01J 29/44* | (2006.01) |
| *B01J 29/85* | (2006.01) |
| *B01J 29/12* | (2006.01) |
| *B01J 29/67* | (2006.01) |
| *B01J 29/83* | (2006.01) |
| *B01J 29/22* | (2006.01) |
| *B01J 23/40* | (2006.01) |

(52) U.S. Cl.
CPC ............ *B01J 35/04* (2013.01); *B01D 53/945* (2013.01); *B01D 53/9477* (2013.01); *B01D 53/9481* (2013.01); *B01D 53/9486* (2013.01); *B01J 21/04* (2013.01); *B01J 23/42* (2013.01); *B01J 29/068* (2013.01); *B01J 29/7415* (2013.01); *B01J 37/0009* (2013.01); *B01J 37/0228* (2013.01); *B01J 37/0234* (2013.01); *B01J 37/0244* (2013.01); *B01J 37/0246* (2013.01); *B01J 37/0248* (2013.01); *F01N 3/0814* (2013.01); *F01N 3/0821* (2013.01); *F01N 3/0835* (2013.01); *F01N 3/0842* (2013.01); *B01D 2255/1021* (2013.01); *B01D 2255/1023* (2013.01); *B01D 2255/2092* (2013.01); *B01D 2255/502* (2013.01); *B01D 2255/91* (2013.01); *B01D 2255/912* (2013.01); *B01J 23/40* (2013.01); *B01J 29/126* (2013.01); *B01J 29/22* (2013.01); *B01J 29/44* (2013.01); *B01J 29/67* (2013.01); *B01J 29/74* (2013.01); *B01J 29/7438* (2013.01); *B01J 29/7446* (2013.01); *B01J 29/7476* (2013.01); *B01J 29/83* (2013.01); *B01J 29/84* (2013.01); *B01J 29/85* (2013.01); *B01J 2229/36* (2013.01); *B01J 2229/42* (2013.01); *F01N 2410/06* (2013.01); *Y02T 10/12* (2013.01)

(58) Field of Classification Search
None
See application file for complete search history.

(56) References Cited

U.S. PATENT DOCUMENTS

| | | |
|---|---|---|
| RE34,804 E | 12/1994 | Lachman et al. |
| 5,492,883 A | 2/1996 | Wu |
| 5,565,394 A | 10/1996 | Lachman et al. |
| 5,633,217 A | 5/1997 | Lynn |
| 5,656,244 A | 8/1997 | Cole |
| 5,800,793 A | 9/1998 | Cole |
| 6,093,378 A * | 7/2000 | Deeba .................. B01D 53/945 423/213.5 |
| 6,503,862 B1 | 1/2003 | Yamamoto |
| 7,922,987 B2 | 4/2011 | Koegel et al. |
| 9,968,916 B2 | 5/2018 | Chang et al. |
| 2004/0166036 A1 | 8/2004 | Chen et al. |
| 2008/0045405 A1* | 2/2008 | Beutel .................. F01N 3/2066 502/103 |
| 2008/0124514 A1* | 5/2008 | Fujdala ................ B01D 53/945 428/116 |
| 2010/0307133 A1 | 12/2010 | Watanabe et al. |
| 2011/0041486 A1* | 2/2011 | Kato .................... B01D 53/945 60/299 |
| 2011/0305612 A1* | 12/2011 | Muller-Stach ....... B01D 53/945 423/212 |

(Continued)

FOREIGN PATENT DOCUMENTS

| | | |
|---|---|---|
| EP | 0909579 A1 | 4/1999 |
| EP | 1027919 A2 | 8/2000 |

(Continued)

*Primary Examiner* — Sheng H Davis

(57) ABSTRACT

A cold start catalyst is disclosed. The cold start catalyst is effective to adsorb $NO_x$ and hydrocarbons (HC) at or below a low temperature and to covert and release the adsorbed $NO_x$ and HC at temperatures above the low temperature. The cold start catalyst comprises a molecular sieve catalyst and a supported platinum group metal catalyst. The molecular sieve catalyst consists essentially of a noble metal and a molecular sieve. The supported platinum group metal catalyst comprises one or more platinum group metals and one or more inorganic oxide carriers. The invention also includes an exhaust system comprising the cold start catalyst, and a method for treating exhaust gas from an internal combustion engine utilizing the cold start catalyst.

13 Claims, No Drawings

(56) References Cited

U.S. PATENT DOCUMENTS

| | | | |
|---|---|---|---|
| 2012/0110988 A1 | 5/2012 | Dotzel et al. | |
| 2012/0117953 A1* | 5/2012 | Andersen | B01J 23/30 60/299 |
| 2012/0308439 A1* | 12/2012 | Chen | B01D 53/945 422/180 |
| 2013/0202509 A1* | 8/2013 | Schuetze | B01D 53/944 423/213.5 |
| 2014/0010744 A1* | 1/2014 | Ruona | F01N 9/00 423/212 |
| 2015/0165423 A1* | 6/2015 | Sung | B01J 29/076 423/213.5 |
| 2015/0251169 A1* | 9/2015 | Baba | F01N 3/2828 60/274 |
| 2016/0144347 A1* | 5/2016 | Sano | B01D 53/8628 |

FOREIGN PATENT DOCUMENTS

| | | |
|---|---|---|
| EP | 1486249 A1 | 12/2004 |
| EP | 2298432 A1 | 3/2011 |
| JP | 2004209323 A | 7/2004 |
| KR | 20010012322 A | 2/2001 |
| KR | 101922733 B1 | 11/2012 |
| KR | 20130109093 A | 10/2013 |
| WO | 9850151 A1 | 11/1998 |
| WO | 2004076829 A1 | 9/2004 |
| WO | 2008047170 A1 | 4/2008 |
| WO | 03056150 A2 | 7/2008 |
| WO | 2011154913 A1 | 12/2011 |
| WO | 2012166868 A1 | 12/2012 |
| WO | 2015005369 * | 1/2015 |
| WO | 2015029382 * | 3/2015 |

\* cited by examiner

COLD START CATALYST AND ITS USE IN EXHAUST SYSTEMS

FIELD OF THE INVENTION

The invention relates to a cold start catalyst and its use in an exhaust system for internal combustion engines.

BACKGROUND OF THE INVENTION

Internal combustion engines produce exhaust gases containing a variety of pollutants, including nitrogen oxides ("$NO_x$"), carbon monoxide, and uncombusted hydrocarbons, which are the subject of governmental legislation. Emission control systems are widely utilized to reduce the amount of these pollutants emitted to atmosphere, and typically achieve very high efficiencies once they reach their operating temperature (typically, 200° C. and higher). However, these systems are relatively inefficient below their operating temperature (the "cold start" period).

As even more stringent national and regional legislation lowers the amount of pollutants that can be emitted from diesel or gasoline engines, reducing emissions during the cold start period is becoming a major challenge. Thus, methods for reducing the level of $NO_x$ and hydrocarbons emitted during cold start condition continue to be explored.

For cold start hydrocarbon control, hydrocarbon trapping components based on zeolites have been investigated. In these systems, the zeolite adsorbs and stores hydrocarbons during the start-up period and releases the stored hydrocarbons when the exhaust temperature is high enough to desorb hydrocarbons. The desorbed hydrocarbons are subsequently converted when the downstream catalytic components reach their operating temperature.

For cold start $NO_x$ control, especially under lean-burn conditions, $NO_x$ storage and release catalysts have been studied. The catalysts adsorb $NO_x$ during the warm-up period and thermally desorb $NO_x$ at higher exhaust temperatures. Downstream catalysts, such as selective catalytic reduction ("SCR") or $NO_x$ adsorber catalysts ("NAC"), effectively reduce the desorbed $NO_x$ to nitrogen.

Typically, $NO_x$ adsorbent materials consist of inorganic oxides such as alumina, silica, ceria, zirconia, titania, or mixed oxides which are coated with at least one platinum group metal. PCT Intl. Appl. WO 2008/047170 discloses a system wherein $NO_x$ from a lean exhaust gas is adsorbed at temperatures below 200° C. and is subsequently thermally desorbed above 200° C. The $NO_x$ adsorbent is taught to consist of palladium and a cerium oxide or a mixed oxide or composite oxide containing cerium and at least one other transition metal.

PCT Intl. Appl. WO 2004/076829 discloses an exhaust-gas purification system which includes a $NO_x$ storage catalyst arranged upstream of an SCR catalyst. The $NO_x$ storage catalyst includes at least one alkali, alkaline earth, or rare earth metal which is coated or activated with at least one platinum group metal (Pt, Pd, Rh, or Ir). A particularly preferred NO storage catalyst is taught to include cerium oxide coated with platinum and additionally platinum as an oxidizing catalyst on a support based on aluminum oxide. EP 1027919 discloses a $NO_x$ adsorbent material that comprises a porous support material, such as alumina, zeolite, zirconia, titania, and/or lanthana, and at least 0.1 wt % precious metal (Pt, Pd, and/or Rh). Platinum carried on alumina is exemplified.

In addition, U.S. Pat. Nos. 5,656,244 and 5,800,793 describe systems combining a $NO_x$ storage/release catalyst with a three way catalyst. The $NO_x$ adsorbent is taught to comprise oxides of chromium, copper, nickel, manganese, molybdenum, or cobalt, in addition to other metals, which are supported on alumina, mullite, cordierite, or silicon carbide. PCT Intl. Appl. WO 03/056150 describes a system combining a low temperature $NO_2$ trap material and a soot filter. The low temperature $NO_2$ trap material is taught to comprise of zeolites exchanged with base metal cations, with the zeolites selected from ZSM-5, ETS-10, Y-zeolite, beta zeolite, ferrierite, mordenite, titanium silicates and aluminum phosphates and the base metals selected from Mn, Cu, Fe, Co, W, Re, Sn, Ag, Zn, Mg, Li, Na, K, Cs, Nd and Pr.

Unfortunately, the $NO_x$ adsorption capacity of such systems is not high enough especially at high $NO_x$ storage efficiency. Because of increasing stringent global legislation regulating the amount of $NO_x$ and hydrocarbons released to the atmosphere from internal combustion engines, the need for more effective exhaust gas cleaning during cold start conditions is always present. In order to overcome these issues, U.S. Appl. Pub. No. 2012/0308439 A1 teaches a cold start catalyst that comprises (1) a zeolite catalyst comprising a base metal, a noble metal, and a zeolite, and (2) a supported platinum group metal catalyst comprising one or more platinum group metals and one or more inorganic oxide carriers. However, U.S. Appl. Pub. No. 2012/0308439 A1 requires a base metal component of the zeolite catalyst component.

As with any automotive system and process, it is desirable to attain still further improvements in exhaust gas treatment systems, particularly under cold start conditions. We have discovered a new cold start catalyst that provides enhanced cleaning of the exhaust gases from internal combustion engines.

SUMMARY OF THE INVENTION

The invention is a cold start catalyst that is effective to adsorb $NO_x$ and hydrocarbons (HC) at or below a low temperature and to convert and release the adsorbed $NO_x$ and HC at temperatures above the low temperature. The cold start catalyst comprises a molecular sieve catalyst and a supported platinum group metal catalyst. The molecular sieve catalyst consists essentially of a noble metal and a molecular sieve. The supported platinum group metal catalyst comprises one or more platinum group metals and one or more inorganic oxide carriers. The invention also includes an exhaust system comprising the cold start catalyst, and a method for treating exhaust gas from an internal combustion engine utilizing the cold start catalyst. The cold start catalyst effectively reduces emissions during the cold start period through improved $NO_x$ storage and $NO_x$ conversion, improved hydrocarbon storage and conversion, and improved CO oxidation.

DETAILED DESCRIPTION OF THE INVENTION

The cold start catalyst of the invention comprises a molecular sieve catalyst and a supported platinum group metal catalyst. The cold start catalyst is effective to adsorb $NO_x$ and hydrocarbons (HC) at or below a low temperature and to convert and release the adsorbed $NO_x$ and HC at temperatures above the low temperature. Preferably, the low temperature is about 200° C. The molecular sieve catalyst consists essentially of, and preferably consists of, a noble metal and a molecular sieve. The noble metal is preferably palladium, platinum, rhodium, gold, silver, iridium, ruthenium, osmium, or mixtures thereof; more preferably, palladium, platinum, rhodium, or mixtures thereof. Palladium is particularly preferred.

The molecular sieve may be any natural or a synthetic molecular sieve, including zeolites, and is preferably composed of aluminum, silicon, and/or phosphorus. The molecular sieves typically have a three-dimensional arrangement of $SiO_4$, $AlO_4$, and/or $PO_4$ that are joined by the sharing of oxygen atoms, but may also be two-dimensional structures as well. The molecular sieve frameworks are typically anionic, which are counterbalanced by charge compensating cations, typically alkali and alkaline earth elements (e.g., Na, K, Mg, Ca, Sr, and Ba), ammonium ions, and also protons.

The molecular sieve is preferably a small pore molecular sieve having a maximum ring size of eight tetrahedral atoms, a medium pore molecular sieve having a maximum ring size of ten tetrahedral atoms, or a large pore molecular sieve having a maximum ring size of twelve tetrahedral atoms. More preferably, the molecular sieve has a framework structure of AEI, MFI, EMT, ERI, MOR, FER, BEA, FAU, CHA, LEV, MWW, CON, EUO, or mixtures thereof.

The molecular sieve catalyst may be prepared by any known means. For instance, the noble metal may be added to the molecular sieve to form the molecular sieve catalyst by any known means, the manner of addition is not considered to be particularly critical. For example, a noble metal compound (such as palladium nitrate) may be supported on the molecular sieve by impregnation, adsorption, ion-exchange, incipient wetness, precipitation, or the like.

The supported platinum group metal catalyst comprises one or more platinum group metals ("PGM") and one or more inorganic oxide carriers. The PGM may be platinum, palladium, rhodium, iridium, or combinations thereof, and most preferably platinum and/or palladium. The inorganic oxide carriers most commonly include oxides of Groups 2, 3, 4, 5, 13 and 14 elements. Useful inorganic oxide carriers preferably have surface areas in the range 10 to 700 m²/g, pore volumes in the range 0.1 to 4 mL/g, and pore diameters from about 10 to 1000 Angstroms. The inorganic oxide carrier is preferably alumina, silica, titania, zirconia, ceria, niobia, tantalum oxides, molybdenum oxides, tungsten oxides, or mixed oxides or composite oxides of any two or more thereof, e.g. silica-alumina, ceria-zirconia or alumina-ceria-zirconia. Alumina and ceria are particularly preferred.

The supported platinum group metal catalyst may be prepared by any known means. Preferably, the one or more platinum group metals are loaded onto the one or more inorganic oxides by any known means to form the supported PGM catalyst, the manner of addition is not considered to be particularly critical. For example, a platinum compound (such as platinum nitrate) may be supported on an inorganic oxide by impregnation, adsorption, ion-exchange, incipient wetness, precipitation, or the like. Other metals, such as iron, manganese, cobalt and barium, may also be added to the supported PGM catalyst.

The cold start catalyst of the present invention may be prepared by processes well known in the prior art. The molecular sieve catalyst and the supported platinum group metal catalyst may be physically mixed to produce the cold start catalyst. Preferably, the cold start catalyst further comprises a flow-through substrate or filter substrate. In one embodiment, the molecular sieve catalyst and the supported platinum group metal catalyst are coated onto the flow-through or filter substrate, and preferably deposited on the flow-through or filter substrate using a washcoat procedure to produce a cold start catalyst system.

The flow-through or filter substrate is a substrate that is capable of containing catalyst components. The substrate is preferably a ceramic substrate or a metallic substrate. The ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates, metallo aluminosilicates (such as cordierite and spudomene), or a mixture or mixed oxide of any two or more thereof. Cordierite, a magnesium aluminosilicate, and silicon carbide are particularly preferred.

The metallic substrates may be made of any suitable metal, and in particular heat-resistant metals and metal alloys such as titanium and stainless steel as well as ferritic alloys containing iron, nickel, chromium, and/or aluminum in addition to other trace metals.

The flow-through substrate is preferably a flow-through monolith having a honeycomb structure with many small, parallel thin-walled channels running axially through the substrate and extending throughout from an inlet or an outlet of the substrate. The channel cross-section of the substrate may be any shape, but is preferably square, sinusoidal, triangular, rectangular, hexagonal, trapezoidal, circular, or oval.

The filter substrate is preferably a wall-flow monolith filter. The channels of a wall-flow filter are alternately blocked, which allow the exhaust gas stream to enter a channel from the inlet, then flow through the channel walls, and exit the filter from a different channel leading to the outlet. Particulates in the exhaust gas stream are thus trapped in the filter.

The molecular sieve catalyst and the supported platinum group catalyst may be added to the flow-through or filter substrate by any known means. A representative process for preparing the cold start catalyst using a washcoat procedure is set forth below. It will be understood that the process below can be varied according to different embodiments of the invention. Also, the order of addition of the molecular sieve catalyst and the supported PGM catalyst onto the flow-through or filter substrate is not considered critical. Thus, the molecular sieve catalyst may be washcoated on the substrate prior to the supported PGM catalyst or the supported PGM catalyst may be washcoated on the substrate prior to the molecular sieve catalyst.

The pre-formed molecular sieve catalyst may be added to the flow-through or filter substrate by a washcoating step. Alternatively, the molecular sieve catalyst may be formed on the flow-through or filter substrate by first washcoating unmodified molecular sieve onto the substrate to produce a molecular sieve-coated substrate. Noble metal may then be added to the molecular sieve-coated substrate, which may be accomplished by an impregnation procedure, or the like.

The washcoating procedure is preferably performed by first slurrying finely divided particles of the molecular sieve catalyst (or unmodified molecular sieve) in an appropriate solvent, preferably water, to form the slurry. Additional components, such as binders or stabilizers may also be incorporated in the slurry as a mixture of water soluble or water-dispersible compounds. The slurry preferably contains between 10 to 70 weight percent solids, more preferably between 20 to 50 weight percent. Prior to forming the slurry, the molecular sieve catalyst (or unmodified molecular sieve) particles are preferably subject to a size reduction treatment (e.g., milling) such that the average particle size of the solid particles is less than 20 microns in diameter.

The flow-through or filter substrate may then be dipped one or more times into the slurry or the slurry may be coated on the substrate such that there will be deposited on the substrate the desired loading of catalytic materials. If noble metal is not incorporated into the molecular sieve prior to washcoating the flow-through or filter substrate, the molecular sieve-coated substrate is typically dried and calcined and then the noble metal may be added to the molecular sieve-coated substrate by any known means, including impregnation, adsorption, or ion-exchange, for example, with a noble metal compound (such as palladium nitrate). Preferably, the entire length of the flow-through or filter substrate is coated with the slurry so that a washcoat of the molecular sieve catalyst covers the entire surface of the substrate.

After the flow-through or filter substrate has been coated with the molecular sieve catalyst slurry, and impregnated with noble metal if necessary, the coated substrate is preferably dried and then calcined by heating at an elevated temperature to form the molecular sieve catalyst-coated substrate. Preferably, the calcination occurs at 400 to 600° C. for approximately 1 to 8 hours.

The washcoat addition of the supported PGM catalyst is preferably accomplished by first preparing a slurry of finely divided particles of the supported PGM catalyst in an appropriate solvent, preferably water. Prior to forming the slurry, the supported PGM catalyst particles are preferably subject to a size reduction treatment (e.g., milling) such that the average particle size of the solid particles is less than 20 microns in diameter. Additional components, such as transition metal oxides, binders, stabilizers, or promoters may be incorporated in the slurry as a mixture of water-dispersible or soluble compounds.

The molecular sieve catalyst-coated substrate may then be dipped one or more times in the supported PGM catalyst slurry or the supported PGM catalyst slurry may be coated on the molecular sieve catalyst-coated substrate such that there will be deposited on the substrate the desired loading of catalytic materials.

Alternatively, a slurry containing only the inorganic oxide(s) may first be deposited on the molecular sieve catalyst-coated substrate to form an inorganic oxide-coated substrate, followed by drying and calcination steps. The platinum group metal(s) may then be added to the inorganic oxide-coated substrate by any known means, including impregnation, adsorption, or ion-exchange of a platinum group metal compound (such as platinum nitrate).

Preferably, the entire length of the flow-through or filter substrate is coated with the supported PGM catalyst slurry so that a washcoat of the supported PGM catalyst covers the entire surface of the substrate.

After the flow-though or filter substrate has been coated with the supported PGM catalyst slurry, it is preferably dried and then calcined by heating at an elevated temperature to produce the cold start catalyst. Preferably, the calcination occurs at 400 to 600° C. for approximately 1 to 8 hours.

In an alternative embodiment, the flow-through or filter substrate is comprised of the molecular sieve catalyst, and the supported platinum group metal catalyst is coated onto the molecular sieve catalyst substrate. In this case, the molecular sieve is extruded to form the flow-through or filter substrate, and the supported platinum group metal catalyst is coated onto the extruded molecular sieve catalyst flow-through or filter substrate. The molecular sieve catalyst extruded substrate is preferably a honeycomb flow-through monolith.

Extruded molecular sieve substrates and honeycomb bodies, and processes for making them, are known in the art. See, for example, U.S. Pat. Nos. 5,492,883, 5,565,394, and 5,633,217 and U.S. Pat. No. Re. 34,804. Typically, the molecular sieve material is mixed with a permanent binder such as silicone resin and a temporary binder such as methylcellulose, and the mixture is extruded to form a green honeycomb body, which is then calcined and sintered to form the final molecular sieve substrate monolith. The molecular sieve may contain noble metal prior to extruding such that a noble metal/molecular sieve substrate (flow-through or filter) monolith is produced by the extrusion procedure.

If a molecular sieve substrate monolith is formed, the molecular sieve substrate monolith is then subjected to an impregnation procedure if necessary to load noble metal onto the molecular sieve monolith, followed by a washcoating step to washcoat the supported PGM catalyst.

The invention also includes an exhaust system for internal combustion engines comprising the cold start catalyst. The exhaust system preferably comprises one or more additional after-treatment devices capable of removing pollutants from internal combustion engine exhaust gases at normal operating temperatures. Preferably, the exhaust system comprises the cold start catalyst and one or more other catalyst components selected from: (1) a selective catalytic reduction (SCR) catalyst, (2) a particulate filter, (3) a SCR filter, (4) a $NO_x$ adsorber catalyst, (5) a three-way catalyst, (6) an oxidation catalyst, or any combination thereof.

These after-treatment devices are well known in the art. Selective catalytic reduction (SCR) catalysts are catalysts that reduce $NO_x$ to $N_2$ by reaction with nitrogen compounds (such as ammonia or urea) or hydrocarbons (lean $NO_x$ reduction). A typical SCR catalyst is comprised of a vanadia-titania catalyst, a vanadia-tungsta-titania catalyst, or a metal/zeolite catalyst such as iron/beta zeolite, copper/beta zeolite, copper/SSZ-13, copper/SAPO-34, Fe/ZSM-5, or copper/ZSM-5.

Particulate filters are devices that reduce particulates from the exhaust of internal combustion engines. Particulate filters include catalyzed particulate filters and bare (non-catalyzed) particulate filters. Catalyzed particulate filters (for diesel and gasoline applications) include metal and metal oxide components (such as Pt, Pd, Fe, Mn, Cu, and ceria) to oxidize hydrocarbons and carbon monoxide in addition to destroying soot trapped by the filter.

Selective catalytic reduction filters (SCRF) are single-substrate devices that combine the functionality of an SCR and a particulate filter. They are used to reduce $NO_x$ and particulate emissions from internal combustion engines. In addition to the SCR catalyst coating, the particulate filter may also include other metal and metal oxide components (such as Pt, Pd, Fe, Mn, Cu, and ceria) to oxidize hydrocarbons and carbon monoxide in addition to destroying soot trapped by the filter.

$NO_x$ adsorber catalysts (NACs) are designed to adsorb $NO_x$ under lean exhaust conditions, release the adsorbed $NO_x$ under rich conditions, and reduce the released $NO_x$ to form $N_2$. NACs typically include a $NO_x$-storage component (e.g., Ba, Ca, Sr, Mg, K, Na, Li, Cs, La, Y, Pr, and Nd), an oxidation component (preferably Pt) and a reduction component (preferably Rh). These components are contained on one or more supports.

Three-way catalysts (TWCs) are typically used in gasoline engines under stoichiometric conditions in order to convert $NO_x$ to $N_2$, carbon monoxide to $CO_2$, and hydrocarbons to $CO_2$ and $H_2O$ on a single device.

Oxidation catalysts, and in particular diesel oxidation catalysts (DOCs), are well-known in the art. Oxidation catalysts are designed to oxidize CO to $CO_2$ and gas phase hydrocarbons (HC) and an organic fraction of diesel particulates (soluble organic fraction) to $CO_2$ and $H_2O$. Typical oxidation catalysts include platinum and optionally also palladium on a high surface area inorganic oxide support, such as alumina, silica-alumina and a zeolite.

The exhaust system can be configured so that the cold start catalyst is located close to the engine and the additional after-treatment device(s) are located downstream of the cold start catalyst. Thus, under normal operating conditions, engine exhaust gas first flows through the cold start catalyst prior to contacting the after-treatment device(s). Alternatively, the exhaust system may contain valves or other gas-directing means such that during the cold-start period (below a temperature ranging from about 150 to 220° C., as measured at the after-treatment device(s)), the exhaust gas is directed to contact the after-treatment device(s) before flowing to the cold start catalyst. Once the after-treatment device(s) reaches the operating temperature (about 150 to 220° C., as measured at the after-treatment device(s)), the exhaust gas flow is then redirected to contact the cold start catalyst prior to contacting the after-treatment device(s). This ensures that the temperature of the cold start catalyst remains low for a longer period of time, and thus improves efficiency of the cold start catalyst, while simultaneously allowing the after-treatment device(s) to more quickly reach operating temperature. U.S. Pat. No. 5,656,244, the teachings of which are incorporated herein by reference, for example, teaches means for controlling the flow of the exhaust gas during cold-start and normal operating conditions.

The invention also includes a method for treating exhaust gas from an internal combustion engine. The method comprises adsorbing $NO_x$ and hydrocarbons (HC) onto the cold start catalyst at temperatures at or below a low temperature, converting and thermally desorbing $NO_x$ and HC from the cold start catalyst at a temperature above the low temperature, and catalytically removing the desorbed $NO_x$ and HC on a catalyst component downstream of the cold start catalyst. Preferably, the low temperature is about 200° C.

The catalyst component downstream of the cold start catalyst is a SCR catalyst, a particulate filter, a SCR filter, a $NO_x$ adsorber catalyst, a three-way catalyst, an oxidation catalyst, or combinations thereof.

The following examples merely illustrate the invention. Those skilled in the art will recognize many variations that are within the spirit of the invention and scope of the claims.

EXAMPLE 1

Preparation of Catalyst

Comparative Catalyst 1A: Pd-Fe/beta zeolite+Pt/$Al_2O_3$

Beta zeolite is added to an aqueous iron nitrate, followed by silica binder to form a slurry. The slurry is coated on a flow-through cordierite substrate to achieve an iron loading of 190 g/ft³ Fe, and the Fe/zeolite-coated substrate is dried, and then calcined by heating at 500° C. for 4 hours. Palladium is then added to the Fe/zeolite-coated substrate by impregnation of an aqueous Pd nitrate solution to achieve a Pd loading of 50 g/ft³, and the Pd-Fe/zeolite-coated substrate is dried and then calcined by heating at 500° C. for 4 hours.

Platinum nitrate is added to a water slurry of alumina particles (milled to an average particle size of less than 10 microns in diameter) to form a Pt/alumina catalyst slurry. The Pt/alumina catalyst slurry is then coated on the Pd-Fe/zeolite-coated substrate to achieve a Pt loading of 25 g/ft³, and the final coated substrate is dried, and then calcined by heating at 500° C. for 4 hours to produce Catalyst 1A (containing 50 g/ft³ Pd, 190 g/ft³ Fe, and 25 g/ft³ Pt).

Catalyst 1 B: Pd/beta Zeolite+Pt/$Al_2O_3$

Catalyst 1B is prepared by according to the procedure of Comparative Catalyst 1A, with the exception that iron nitrate is not added.

EXAMPLE 2

Testing Procedures

The catalysts are tested on core samples (2.54 cm×8.4 cm) of a flow-through catalyst-coated cordierite substrate. Catalyst cores are first aged under flow-through conditions in a furnace under hydrothermal conditions (5% $H_2O$, balance air) at 750° C. for 16 hours. The cores are then tested for catalytic activity in a laboratory reactor, using a feed gas stream that is prepared by adjusting the mass flow of the individual exhaust gas components. The gas flow rate is maintained at 21.2 L $min^{-1}$ resulting in a Gas Hourly Space Velocity of 30,000 $h^{-1}$ (GHSV=30,000 $h^{-1}$).

The catalysts are tested under lean conditions, using a synthetic exhaust gas feed stream consisting of 200 ppm NO, 200 ppm CO, 500 ppm decane (on $C_1$ basis), 10% $O_2$, 5% $CO_2$, 5% $H_2O$ and the balance nitrogen (volume %). The catalyst is exposed to the feed gas stream, first at an isothermal inlet gas temperature of 80° C. for 100 seconds, following which the inlet gas temperature is increased to 650° C. with a ramp rate of 100° C./min.

The results in Table 1 show that Catalyst 1B of the invention is comparable to Comparative Catalyst 1A, showing that base metal can be removed from the zeolite component of the cold start catalyst without affecting its catalytic performance.

In summary, the cold start catalyst system of the invention performs multiple functions, including (1) low temperature $NO_x$ storage and conversion with high selectivity to $N_2$; (2) low temperature hydrocarbon storage and conversion; and (3) improved CO oxidation activity.

TABLE 1

Comparison of Catalyst 1B and Comparative Catalyst 1A

|  | Catalyst 1B | Comparative Catalyst 1A * |
|---|---|---|
| $NO_x$ storage capacity at 80° C. (g $NO_2$/L) | 0.32 | 0.34 |
| $NO_x$ trapping efficiency at the end of 100 sec (%) | 78 | 78 |
| Cumulative $NO_x$ storage capacity below 200° C. (g $NO_2$/L) | 0.45 | 0.46 |
| Cumulative HC storage and conversion efficiency below 200° C. (%) | 98 | 98 |
| Cumulative CO conversion efficiency below 200° C. (%) | 44 | 45 |

* Comparative Example

We claim:
1. A cold start catalyst article comprising: (1) a molecular sieve catalyst coating consisting of palladium on a molecular sieve having a maximum ring size of eight tetrahedral atoms for adsorbing $NO_x$ from a diesel engine exhaust gas (2) a supported platinum group metal catalyst coating comprising one or more platinum group metals and one or more inorganic oxide carriers, and (3) a flow-through honeycomb monolith or a wall-flow filter substrate, wherein the molecular sieve catalyst is disposed on or in the substrate as a bottom coating and the platinum group metal catalyst is disposed on the molecular sieve catalyst coating as a top coating.

2. The cold start catalyst article of claim 1 wherein the platinum group metal is platinum.

3. The cold start catalyst article of claim 1 wherein the one or more platinum group metals is selected from the group consisting of platinum, palladium, rhodium, iridium, and mixtures thereof.

4. The cold start catalyst article of claim 1 wherein the one or more inorganic oxide carriers is selected from the group consisting of alumina, silica, titania, zirconia, ceria, niobia, tantalum oxides, molybdenum oxides, tungsten oxides.

5. The cold start catalyst article of claim 1 wherein the substrate is a filter.

6. The cold start catalyst article of claim 5 wherein the substrate is a flow-through honeycomb monolith.

7. The article of claim 1, wherein the molecular sieve has an AEI framework.

8. The article of claim 1, wherein the molecular sieve has a CHA framework.

9. An exhaust system for diesel engines comprising the cold start catalyst article of claim 1.

10. The exhaust system of claim 9 further comprising a catalyst component selected from the group consisting a selective catalytic reduction (SCR) catalyst, a particulate filter, a SCR filter, a $NO_x$ adsorber catalyst, an oxidation catalyst, and combinations thereof.

11. A method for treating exhaust gas from a diesel engine, said method comprising adsorbing $NO_x$ onto the cold start catalyst article of claim 1 below a low temperature, converting and thermally desorbing $NO_x$ from the cold start catalyst article at temperatures above the low temperature, and catalytically removing the desorbed $NO_x$ on a catalyst component downstream of the cold start catalyst.

12. The method of claim 11 wherein the low temperature is 200° C.

13. The method of claim 11 wherein the catalyst component downstream of the cold start catalyst article is selected from the group consisting of a SCR catalyst, a particulate filter, a SCR filter, a $NO_x$ adsorber catalyst, an oxidation catalyst, and combinations thereof.

* * * * *